(12) United States Patent
Yun et al.

(10) Patent No.: US 6,411,405 B1
(45) Date of Patent: Jun. 25, 2002

(54) METHOD AND APPARATUS FOR CORRECTING SCANNING ERRORS IN A SHUTTLE TYPE SCANNER

(75) Inventors: Young-jung Yun, Suwon; Jong-ho Ha, Kyonggi-do, both of (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/207,586

(22) Filed: Dec. 8, 1998

(30) Foreign Application Priority Data

Dec. 8, 1997 (KR) .............................. 97-66680

(51) Int. Cl.[7] ................................................. H04N 1/04
(52) U.S. Cl. ....................... 358/488; 358/474; 358/494; 358/496
(58) Field of Search ................................ 358/406, 474, 358/488, 496, 472, 494; 347/19

(56) References Cited

U.S. PATENT DOCUMENTS

| | | | |
|---|---|---|---|
| 5,250,956 A | 10/1993 | Haslby et al. ................ 347/19 |
| 5,297,017 A | 3/1994 | Haslby et al. ................ 347/19 |
| 5,644,344 A | 7/1997 | Haslby ........................ 358/1.5 |
| 6,155,665 A | * 12/2000 | Lee ............................. 347/19 |
| 6,175,428 B1 | * 1/2001 | On et al. ..................... 358/406 |
| 6,236,471 B1 | * 5/2001 | Lee ............................. 358/474 |
| 6,243,173 B1 | * 6/2001 | Lee ............................. 358/488 |

* cited by examiner

Primary Examiner—Cheukfan Lee
(74) Attorney, Agent, or Firm—Robert E. Bushnell, Esq.

(57) ABSTRACT

A method for correcting scanning errors in a shuttle type of a scanner, including the steps of scanning a pattern sheet on which pattern data having a specified shape are recorded. Errors for decline of the pattern data are corrected by using the pattern data having a straight line among the scanned pattern data having the specified shape. Then, errors for distance between bands are corrected by using the pattern data having the specified shape among the pattern data of which the errors for decline are corrected. Accordingly, since the errors for decline and the errors for distance between the bands can be corrected by using a computing program, there is an advantage in that correcting the errors of the pattern data is very simple. A further advantage is in that even if the scanner is subjected to an impact from its exterior, correcting the errors for decline and the errors for distance between the bands can be promptly performed.

33 Claims, 8 Drawing Sheets

METHOD AND APPARATUS FOR CORRECTING SCANNING ERRORS IN A SHUTTLE TYPE SCANNER

This application makes reference to, incorporates the same herein, and claims all benefits accruing under 35 U.S.C. §119 from an application for A METHOD FOR CORRECTING SCANNING ERRORS IN A SHUTTLE TYPE OF A SCANNER earlier filed in the Korean Industrial Property Office on the Dec. 8, 1997 and there duly assigned Ser. No. 66680/1997.

BACKGROUND OF THE INVENTION

1. Field of the Invention

The present invention relates to a shuttle type of a scanner, and more particularly to a method and apparatus for correcting scanning errors in a shuttle type of a scanner, in which errors for decline of pattern data are detected and corrected and errors for distance between bands are detected so that a carrying distance of a document is corrected.

2. Description of the Related Art

Generally, a shuttle type of a scanner is an apparatus including a scanning head which is reciprocally mounted on a guide shaft disposed normally to a direction of carrying the document and scans an image recorded on the document. The scanner further includes a lamp assembly including a lamp emitting light on the image of the document, a lens assembly including a lens collecting the light reflected from the document, a charge coupled device assembly including a charge coupled device which converts the reflected light collected by the lens into an electric signal. The lens assembly includes a filter and a lens holder which is movable between the charge coupled device assembly and the lamp assembly. The lens assembly and the charge coupled device assembly are rotatably integrated with each other.

A control screw has a thread portion which has thread on the surface thereof to rotate the charge coupled device. On the other hand, the charge coupled device assembly also has a thread formed on the surface thereof which the thread portion contacts. The thread of the control screw is engaged with the thread of the charge coupled device so that the charge coupled device is rotated as the control screw is controlled.

The shuttle type scanner scans a plurality of slices respectively including numbers of pixels simultaneously or in sequence. Provided that a slice includes one hundred sixty pixels, for example, the slice has a size of 13.547 mm (4.67 $\mu$m×one hundred sixty pixels)in a resolution of 300 dpi. That is, a slice of pixels includes the one hundred sixty pixels and a band (referred to as a scanning area which the scanning head scans) includes twenty four hundred slices and twenty two bands are presented in the document having an A4 size.

When the scanner starts to scan the document, scanned data are sequentially stored in a memory a slice by a slice. Therefore, when the scanning of a band of data is completed, the image data having 160×2400 bytes are stored in the memory.

The scanning head does not occasionally align with the document due to a tolerance of a scanning module in assembling the scanner. In this case, the data stored in the memory are discontinued at a boundary of the bands and declined.

Also, the document must be carried by a band but is not accurately carried due to a mechanical tolerance of an electric motor for carrying the document. Accordingly, errors for distance at which the document is carried are generated. As a result, the document is carried at a distance less or more than a band. The data stored in the memory are discontinued at the boundary of the bands and pixels at the boundary of the bands are eccentric to each other.

A worker must adjust the scanning head by handling the control screw to correct errors for decline of the scanning head. The errors for distance of the bands, however, are ignored.

When the worker adjusts the scanning head by handling the control screw to correct errors for decline of the image data, there is a problem in that it is difficult to adjust the scanning head accurately. Furthermore, there is a disadvantage in that since the separate control screw and control zig are required for correcting the errors for decline of the image data, manufacturing of the scanner is complex and productivity for manufacturing the scanner is degraded.

Furthermore, since the errors for distance of the bands are ignored, the quality of printing is degraded.

U.S. Pat. No. 5,644,344 to Haselby, entitled Optical Print Cartridge Alignment System and discloses an apparatus and techniques for aligning the operation of the ink jet printhead cartridges of a multiple printhead ink jet swath printer that includes a print carriage that is movable along a horizontal carriage scan axis, first and second ink jet printhead cartridges supported by the movable carriage for printing onto a print media that is selectively movable along a vertical media scan axis, and an optical sensor supported by the movable carriage.

U.S. Pat. No. 5,250,956 to Haselby et al., entitled Print Cartridge Bidirectional Alignment In Carriage Axis, disclose an apparatus and techniques for aligning the operation of the ink jet printheads of a multiple printhead ink jet swath printer, and particularly for aligning the operation of the printheads along the carriage scan axis. The patent discloses the relative positions of vertical test line segments printed by the cartridges at a fixed swath position are determined with an optical sensor. The relative position information is disclosed as being utilized to calculate horizontal alignment corrections for the printhead cartridges which are utilized to adjust the horizontal offset shifts provided for the swath data and to adjust the timing of the firing of the ink jet nozzles of the printhead cartridges.

U.S. Pat. No. 5,297,017 to Haselby et al., entitled Print Cartridge Alignment In Paper Axis, disclose an apparatus and techniques for aligning the operation of the ink jet printhead cartridges of a multiple printhead ink jet swath printer that includes a print. carriage that is movable along a horizontal carriage scan axis, first and second ink jet printhead cartridges supported by the movable carriage for printing onto a print media that is selectively movable along a vertical media scan axis, and an optical sensor supported by the movable carriage. It is disclosed that alignment of the operation of the printheads along the media scan axis is performed by determining with the optical sensor the relative positions of horizontal test line segments printed by selected nozzles of the printhead cartridges. The relative position information is utilized to calculate a vertical alignment correction which is implemented by enabling selected ink jet nozzles of the printheads and adjusting the position of one printhead cartridge relative to the other such that the nozzles of the ink jet printheads are properly spaced along the media scan axis.

SUMMARY OF THE INVENTION

The present invention has been made to overcome the above described problems of the contemporary practice in the art.

It is an object of the present invention to provide a method for correcting scanning errors in a shuttle type of a scanner, in which errors for decline of pattern data and errors for distance between bands are determined by using a computing program and amount of value for correcting the errors is applied to the pattern data every time when scanning a document, whereby the errors for decline of the pattern data and the errors for distance between the bands can be corrected without use of a separate element.

To accomplish the above objects of the present invention, according to one aspect of the present invention, there is provided a method for correcting scanning errors in a shuttle type of a scanner, comprising the steps of: scanning a recordable medium on which pattern data having a straight line shape are recorded in parallel to a direction that a document is carried; detecting scanning errors between an actual coordinate at which the pattern data having the straight line shape are detected in a first line of a first band and an actual coordinate at which the pattern data are detected in a last line of the first band; detecting a first reference point at which a center line of a band intersects the pattern data having the straight line shape in the first band and rotating the pattern data on the first reference point in a direction to the center line by a half value of the scanning errors;

detecting an actual coordinate at which the pattern data having the straight line shape are detected in a second band and determining a presumed coordinate when the pattern data in the second band are extended along the actual coordinate to a last line of the first band; comparing the presumed coordinate with the actual coordinate in the last line of the first band to detect the scanning errors; correcting the scanning errors by moving the pattern data having the straight line shape in the second band by an amount of the scanning errors; and detecting a second reference point at which a center line intersects the pattern data having the straight line shape in the second band and rotating the pattern data having the straight line shape on the second reference point in a direction to the center line by half of the scanning errors, wherein the correcting value for the decline of the pattern data is applied to a document data to correct the scanning errors every time when scanning the document.

The recordable medium can be a pattern sheet and has the straight lines stamped at a point of a frame in a scanning region which is spaced apart from a region on which the document is carried.

According to another aspect of the present invention, there is provided a method for correcting scanning errors in a shuttle type of a scanner, comprising the steps of: scanning a recordable medium on which pattern data having a specified shape are recorded; creating imaginary pattern data by horizontally moving the pattern data having the specified shape by a predetermined number of pixels in a predetermined direction in a first band; detecting an actual coordinate of a pixel in which the pattern data having the specified shape are recorded in a first line of a second band; detecting a contact coordinate at which an imaginary line extending from the actual coordinate in a direction normal to a boundary line between a first band and the second band intersects the imaginary pattern data in the first band; determining scanning errors for a vertical axis between the first band and the second band; horizontally moving the pattern data having the specified shape in a direction opposed to the predetermined direction by a predetermined number of pixels in the first band; detecting a carrying distance of a document by adding an actual carrying distance of the document to the scanning errors for the vertical axis; and storing the carrying distance, wherein the document is carried by the carrying distance every time when scanning the document.

According to a further aspect of the present invention, there is provided a method for correcting scanning errors in a shuttle type of a scanner, comprising the steps of: scanning a recordable medium on which pattern data having an inclined line shape and inclining at an angle of 45° are recorded; detecting a first coordinate of a pixel in which the pattern data having the inclined line shape are recorded in a last line of a first band; detecting a second coordinate of a pixel in which the pattern data having the inclined line shape are recorded in a first line of a second band; determining distance errors for a horizontal axis between the first coordinate and the second coordinate; detecting a carrying distance by adding an actual carrying distance of a document to the distance errors for the horizontal axis; and storing the carrying distance, wherein the document is carried by the carrying distance every time when scanning the document.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Hereinafter, methods for correcting scanning errors in a scanner according to the present invention will be described in detail with reference to accompanying drawings, wherein like numerals denotes like elements.

Figure 1A:
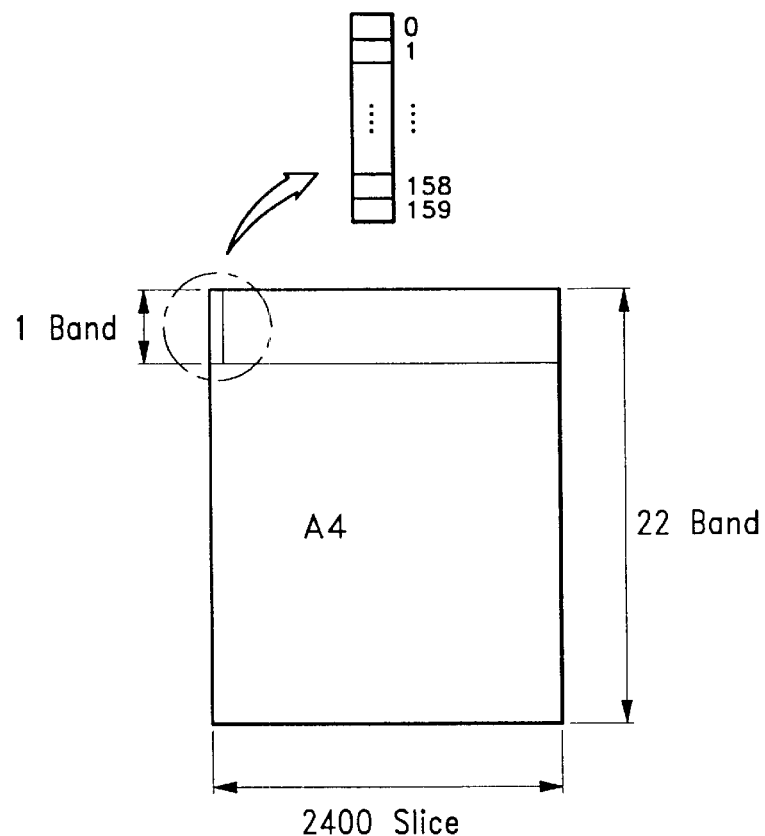
FIG. 1A is a view of a recordable medium having an A4 size, of which data are divided into plural bands and slices of data and scanned a band by a band.

The shuttle type scanner scans a plurality of slices respectively including numbers of pixels simultaneously or in sequence as shown in FIG. 1A. Provided that a slice includes one hundred sixty pixels, for example, the slice has a size of 13.547 mm (4.67 μm×one hundred sixty pixels) in a resolution of 300 dots per inch (dpi). That is, a slice of pixels includes the one hundred sixty pixels and a band (referred to as a scanning area which the scanning head scans) includes twenty four hundred slices and twenty two bands are presented in the document having an A4 size.

When the scanner starts to scan the document, scanned data are sequentially stored in a memory a slice by a slice. Therefore, when the scanning of a band of data is completed, the image data having 160×2400 bytes are stored in the memory.

Figure 1B:
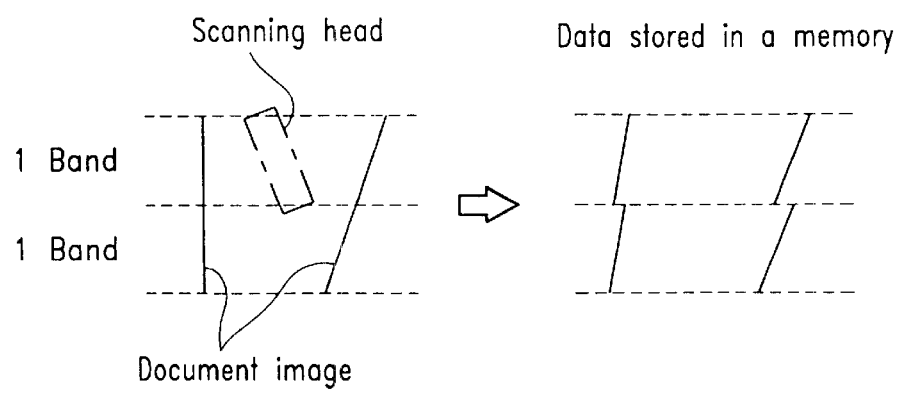
FIG. 1B is a view of pattern data recorded on a pattern sheet and scanned data in which errors for decline and errors for distance between bands are generated.

The scanning head does not occasionally align with the document due to a tolerance of a scanning module in assembling the scanner. In this case, the data stored in the memory are discontinued at a boundary of the bands and declined as shown in FIG. 1B.

Figure 2:
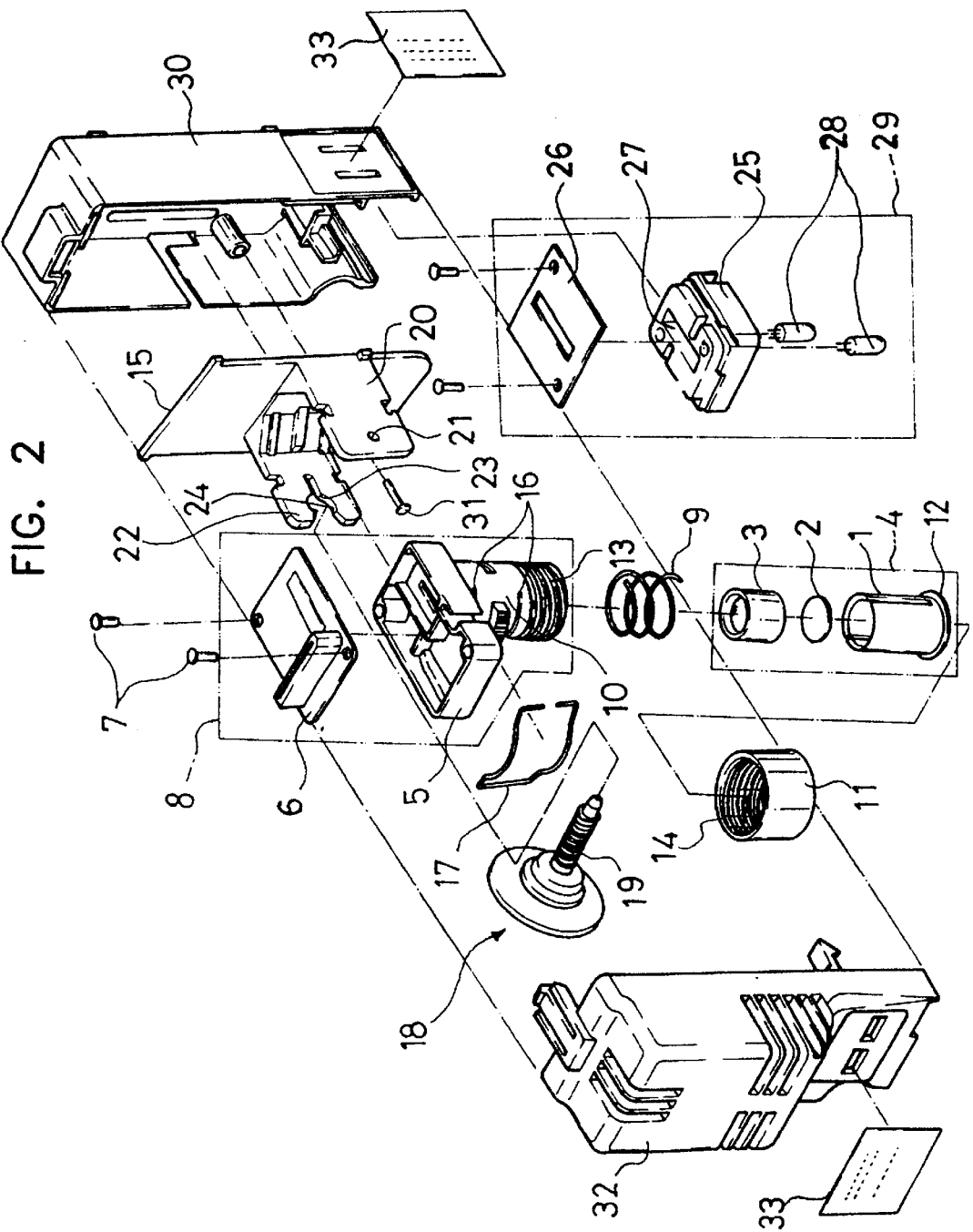
FIG. 2 is an exploded perspective view of a shuttle type scanning module according to the present invention.

FIG. 2 is an exploded perspective view of a shuttle type of a scanning module according to the present invention. An operation of assembling the scanning module will be briefly described. A lens assembly 4 is assembled in a manner that a filter 2 is inserted into a lens holder 1, in which in turn a lens 3 is inserted and then the filter 2 and the lens 3 are fixed to the lens holder 1 by fusing. A charge coupled device assembly 8 is made by fixing a charge coupled device board 6 to a frame 5 by means of fixing members 7 such as screws. After a spring 9 is disposed around a peripheral surface of the lens holder 1, the lens assembly 4 is integrated with the charge coupled device assembly 8 in a manner that the lens holder 1 is inserted into a connecting portion 10 of the frame 5 in the charge coupled device assembly 8 and a cap lens 11 is threaded for combining with the connecting portion 10. The lens holder 1 has a step portion 12 at an end thereof so that when the spring 9 is disposed around the peripheral surface of the lens holder 1, the spring 9 is supported by the step portion 12 of the lens holder 1. The connecting portion 10 of the frame 5 has a male thread 13 on an outer surface thereof and the cap lens 11 has a female thread 14 on an inner surface thereof. Accordingly, the cap lens 11 is combined by threading with the connecting portion 10 in such a manner that the cap lens 11 is moved along the outer surface of the connecting portion 10 of the frame 5 through a rotating motion.

After the lens assembly 4 and the charge coupled assembly 8 are integrated with a frame base 15, a spring clip 17 is assembled with the connecting portion 10 of the frame 5 in such a manner that both ends of the spring clip 17 are inserted into clip holes 16, respectively. A control screw 18 is rotatably combined with the frame base 15 in such a manner that a distal end apart from a knob of the control screw 18 is inserted into a hole 21 formed in a support 20 and a proximal end adjacent to the knob of the control screw 18 is fitted in a snap portion 23 of a support 22. Since the snap portion 23 of the support 22 has upper and lower steps spaced from each other at a distance less than a diameter of a screw portion 19, the screw portion 19 of the control screw 18 can be prevented from being separated from the frame base 15.

A lamp assembly 29 is made in a manner that a lamp board 26 is integrated with a reflecting mirror 25 and at least one lamp 28 is inserted into a throughhole 27 of the reflecting mirror 25. Then, the lamp assembly 29 is fitted on a lower portion of a lower cover 30. The lens assembly 4 and the charge coupled device assembly 8 integrated with the frame base 15 are mounted over an upper portion of the lamp assembly 29 in the lower cover 30 and combined with the lower cover 30 by means of connecting members, for example screws.

When the assembly is completed as described above, correcting errors for decline of the scanning module is carried out. Finally, an upper cover 32 is disposed to cover the lens assembly 4, the charge coupled device assembly 8, and the lamp assembly 29 and to be engaged with the lower 9 cover 30. Accordingly, the assembly of the scanning head is finally completed.

Figure 3:
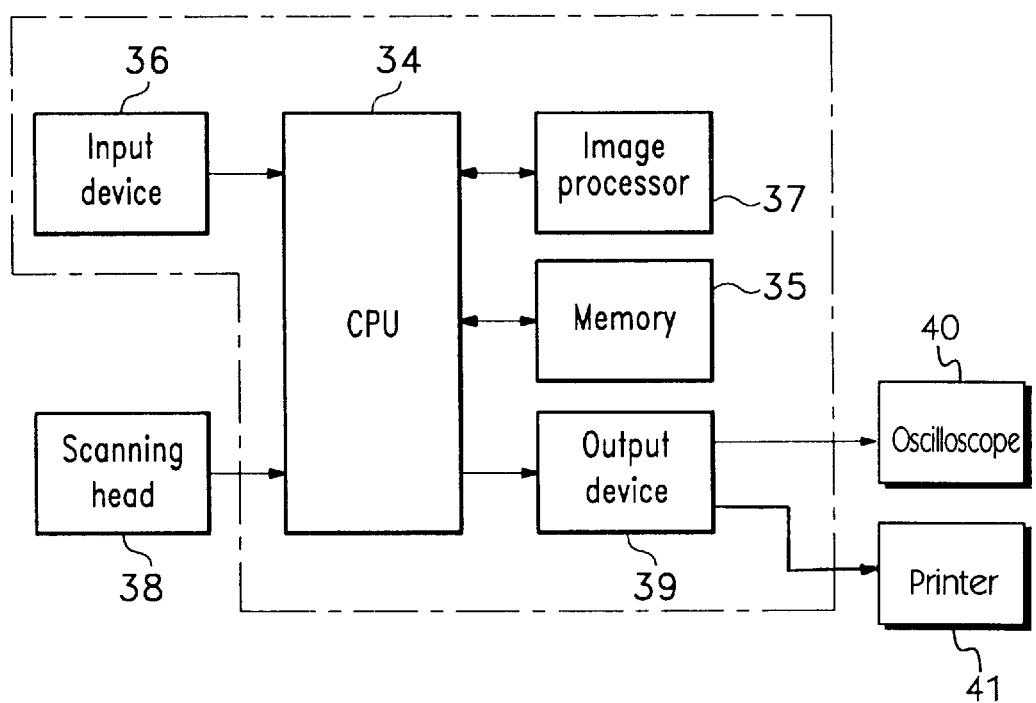
FIG. 3 is a schematic block diagram of a device for correcting scanning errors according to the present invention.

FIG. 3 is a schematic block diagram of a device for correcting the scanning errors according to the present invention. As shown in FIG. 3, a central processing unit (CPU) 34 controls an entire system according to a program. A memory 35 has various program data and image data generated during a processing of an image stored therein. An input device 36, for example buttons, receives operating signals generated by a user and transfers the operating signals to the CPU 34.

An image processor 37 processes image data scanned by the scanning head 38 in such a manner as for correcting scanning errors of the image data and the like. An output device outputs the image data corrected by the image processor 37 to a monitor, such as oscilloscope 40, or a printer, such as printer 41.

Hereinafter, an operation of the scanning head according to the present invention will be described in detail with reference to FIGS. 4 to 7.

Figure 4:
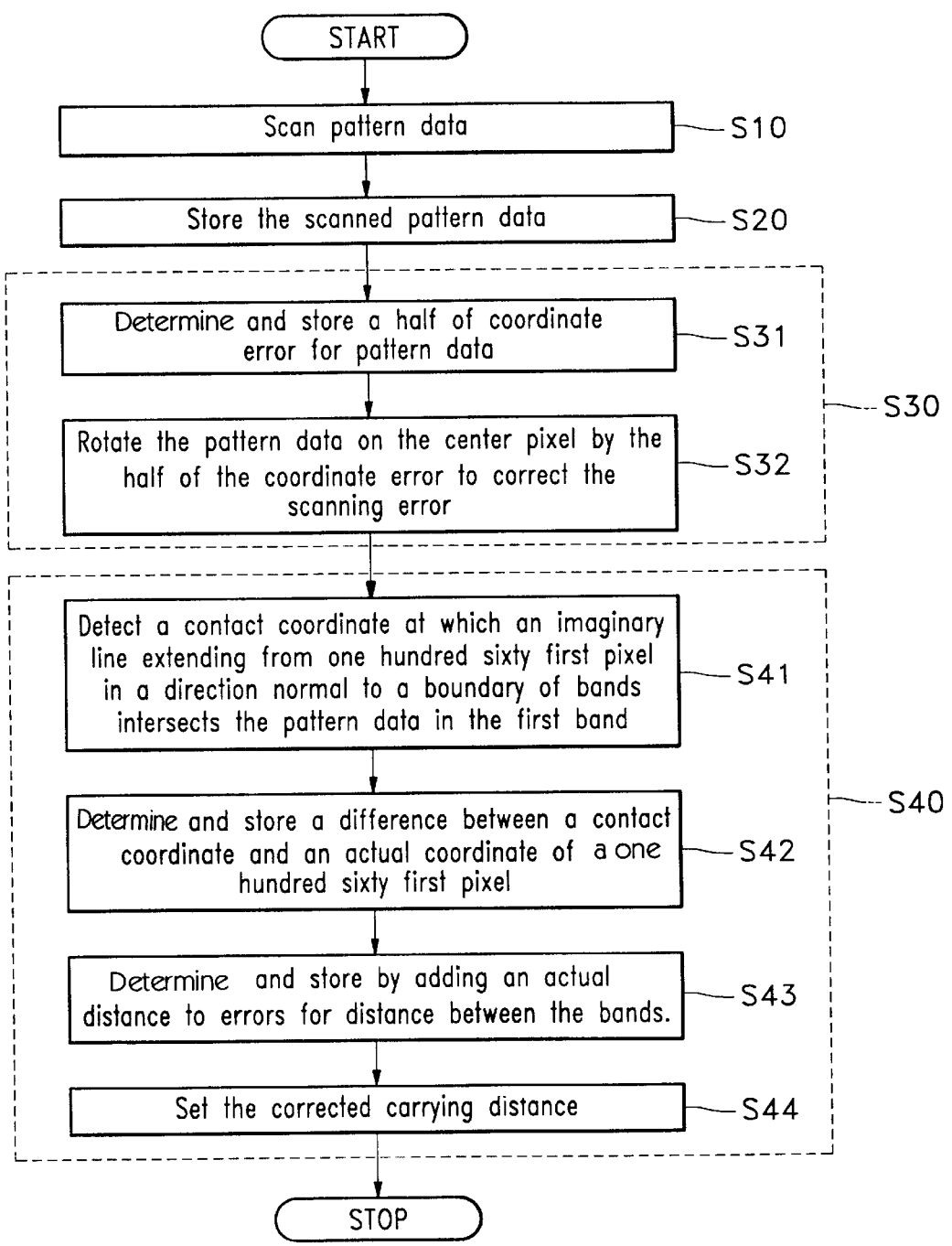
FIG. 4 is a flow chart showing a process of correcting the scanning errors of a scanning head in the shuttle type of scanner according to the present invention.
Figure 5:
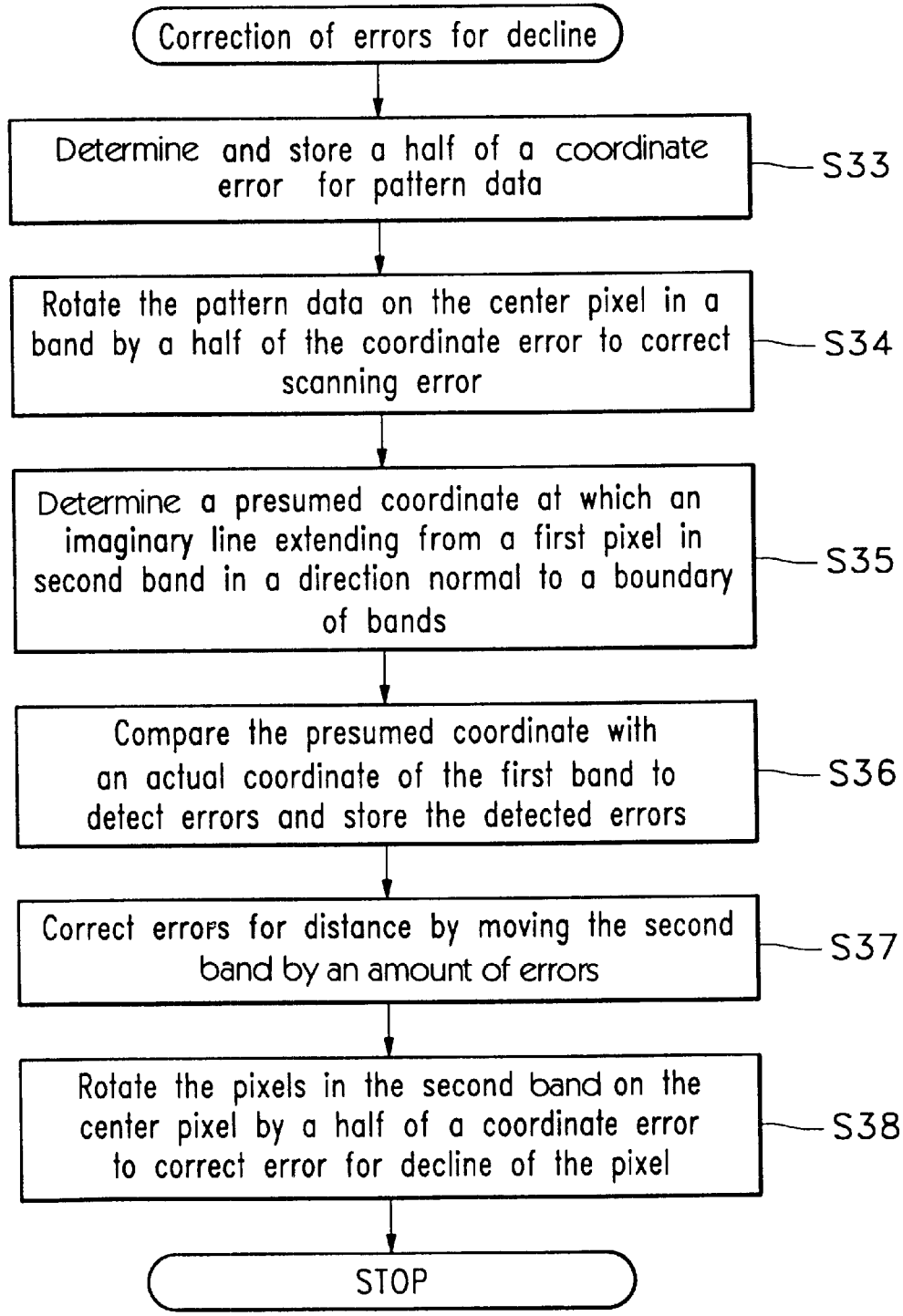
FIG. 5 is a flow chart showing a process of correcting errors for decline in scanning an image according to the present invention.
Figure 6:
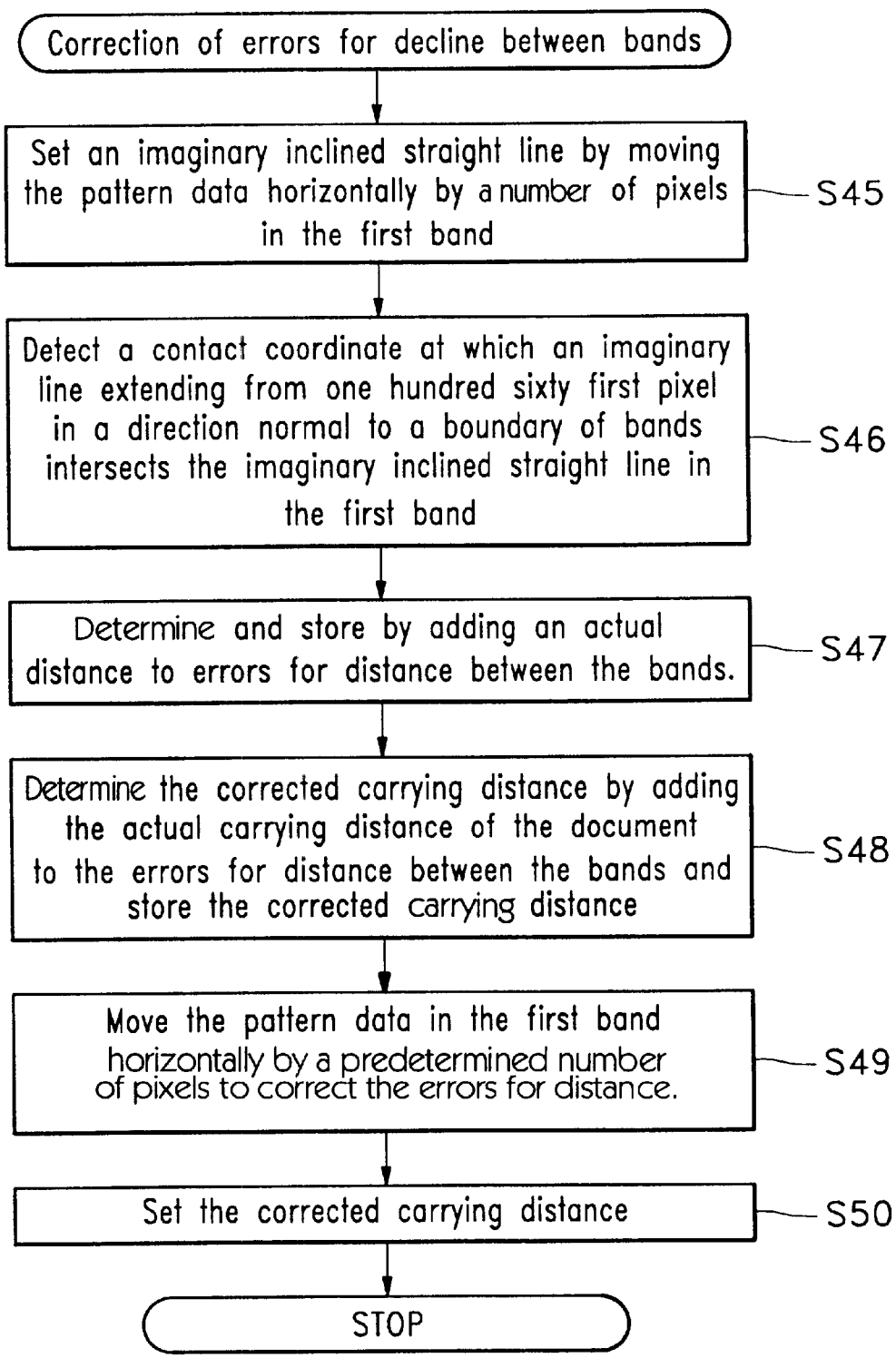
FIG. 6 is a flow chart showing a process of correcting errors for distance between bands in scanning the image according to the present invention.

FIG. 4 is a flow chart showing a process of correcting the scanning errors in the scanning head, FIG. 5 is a flow chart showing a process of correcting errors for decline of image data, and FIG. 6 is a flow chart showing a process of correcting errors for distance between the bands.

When a pattern sheet having a straight line or a specified shape recorded thereon is set in a scanning region and a function of correcting errors for decline is selected in the scanner, a signal corresponding to the function of correcting errors for decline is transferred to the CPU 34 through the input device 36. The pattern sheet on which the straight lines or the specified shaped-character is recorded is used to correct the scanning errors. However, it is understood that a pattern sheet on which the straight line or the specified shaped-character is stamped can be used to correct the scanning errors and a printing paper on which characters are printed by the printer head is scanned to correct the scanning errors. The straight line or the specified shaped-character is preferably stamped at a point of a frame of the scanner in a scanning region which is spaced apart from a region on which the document is carried. The present invention will be described with respect to the pattern sheet having the straight line or the specified shaped-character.

Referring to FIGS. 3–6, the CPU 34 makes the scanning head 38 to operate for scanning of the pattern data which are recorded on the pattern sheet, at step S10. The scanned pattern data are stored in a memory 35 according to instructions of the CPU 34, at step S20. If the errors for decline of the pattern data and the errors for distance between the bands are generated during the scanning of the pattern data, the pattern data which is stored in the memory 35 are the same as shown in FIG. 1B.

The CPU 34 transfers the pattern data stored in the memory 35 to the image processor 37. The image processor 37 performs correcting of the errors for decline of the pattern data using the data corresponding to the straight line among the pattern data transferred from the memory 35, at step S30.

Provided that a band of data includes one hundred sixty pixels, for example, there is a coordinate error between an x-axis coordinate of the first pixel and an x-axis coordinate of the hundred sixtieth pixel in the first band, which is in correspondence with the incline of the pattern data. A half of the coordinate error is determined and stored in the memory 35, at step S31. Then, the pattern data is rotated by the half of the coordinate error on the eightieth pixel positioned at an intermediate position between the first pixel and the hundred sixtieth pixel, at step S32. Accordingly, the scanned pattern data are held in the straight line. The pattern data in the other bands can be held in the straight line in such a manner as described above.

Figure 7A:
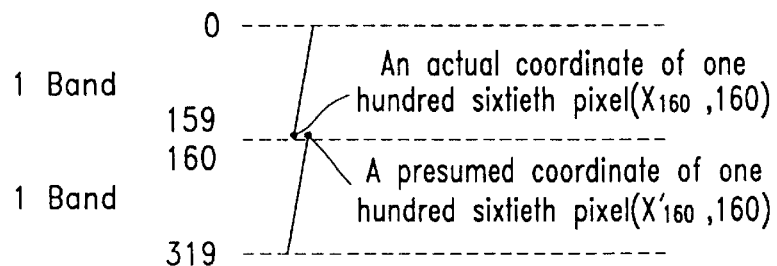
FIGS. 7A to 7D show the scanning errors including the errors for decline and the errors for distance between the bands in scanning the image.

On the other hand, even though the correcting of the errors for decline is performed for the pattern data in each band when a document skews along the supplying pathway in the scanner, the pattern data are separated into two parts at a boundary between the bands. That is, the pattern data are eccentricic to each other at the boundary between the bands. To correct the eccentricity of the pattern data between the bands, first the pattern data in the next band are rotated by the half of the errors for decline of the pattern data on the intermediate pixel in the next band. Referring to FIG. 5, after the correcting of the errors for decline of the first pixel to the hundred sixtieth pixel in the first band is performed at the steps S33 and S34, a correcting of errors for decline of the hundred sixty first pixel to the three hundred twentieth pixel in the second band is performed. At that time, a presumed coordinate $(X'_{160}, 160)$ of the one hundred sixtieth pixel is determined which extends from the one hundred sixty first pixel, at step S35 as illustrated in FIG. 7A. Then, the presumed coordinate $(X'_{160}, 160)$ is compared with the coordinate $(X_{160}, 160)$ of the one hundred sixtieth pixel in the first band to detect and store the error at step S36. Sequentially, the pattern data in the first band is moved so that the error for decline of the pattern data are corrected, at step S37. Finally, the pattern data is rotated by the half of the errors for decline on the two hundred eightieth pixel in the same manner as described above with respect to the pattern data in the first band, at step S38. It is therefore possible to correct the errors due to the skew of the document which is carried.

Figure 7B:
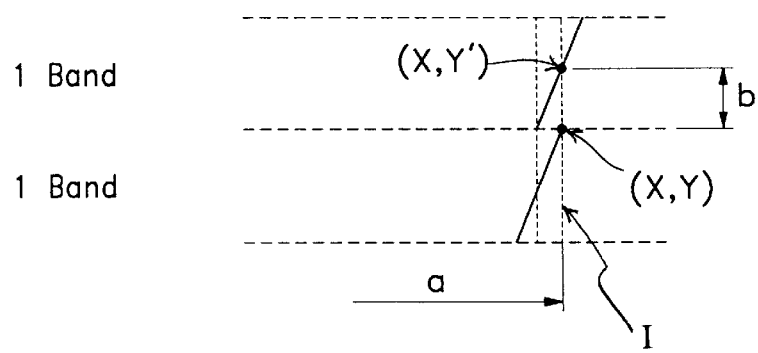

Referring to FIG. 4, when the correcting of the errors for decline of the pattern data is completed as described above, the correcting of the errors for the distance between the bands is then performed, at step S40. That is, in the case of that the pattern data are scanned as shown in FIG. 7B, a contact coordinate (X, Y') is detected at a point at which an imaginary line I extending from the one hundred sixty first pixel in a direction normal to the boundary between the first and second bands intersects the pattern data in the first band, at step S41. If the intersecting point is detected, it means that a carrying distance of the document is smaller than a reference distance so that the pattern data being the inclined straight line are overlapped on each other by a predetermined distance. The error b for the distance between the bands is detected and stored by determining a difference between the contact coordinate (X, Y') and the coordinate (X, Y) of the one hundred sixty first pixel, at step S42. Then, a carrying distance is obtained and stored by adding on amount of the error for the distance between the bands to an actual carrying distance, at step S43. The document is carried the carrying distance, at step S44. Therefore, the corrected carrying distance at which the document is carried is larger than the actual distance at which the document is carried. As a result, the carrying distance is increased so that the errors for distance between the bands are corrected.

Figure 7C:
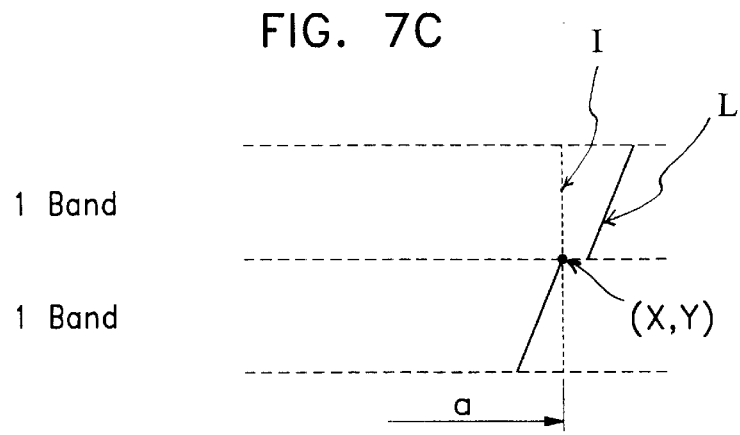
Figure 7D:
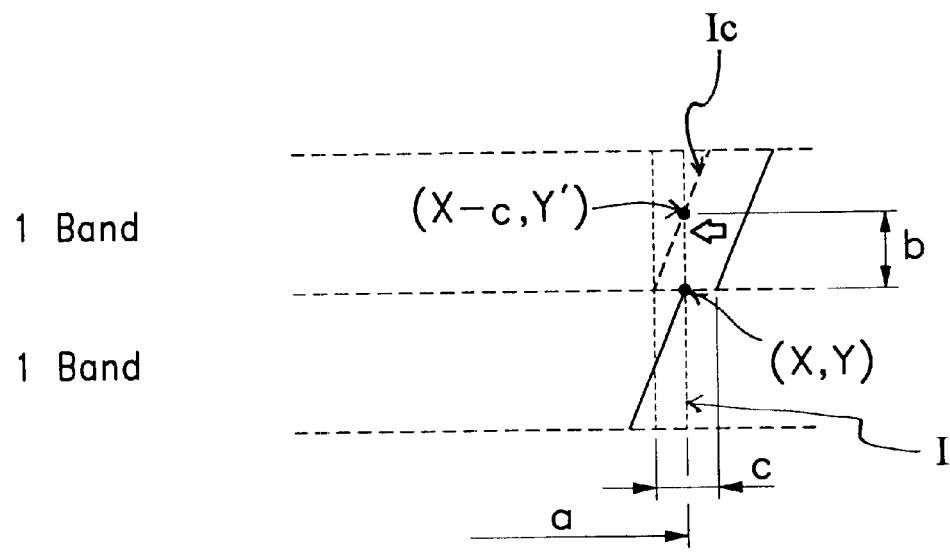

Referring to FIG. 6, on the other hand, in the case of that the actual carrying distance at which the document is carried is larger than the reference distance to skip the pattern data having the inclined straight line during the scanning of the document, it is impossible to detect the contact point at which the imaginary line I extending from the one hundred sixty first pixel in the direction normal to the boundary of the bands intersects the inclined straight line L in the first band, as shown in FIG. 7C. An imaginary inclined straight line Ic is positioned at a position at which the pattern data having the inclined straight line are horizontally moved to the left by a predetermined number of pixels c in the first band as shown in FIG. 7D, at step S45. Then, a contact coordinate (X-c, Y') is obtained at a contact point at which the imaginary line I extending from the one hundred sixty first pixel in the direction normal to the boundary between the first and second bands intersects the imaginary inclined straight line Ic, at step S46. Then, it is performed to determine a difference between the contact coordinate (X-c, Y') in the first band and an actual coordinate (X, Y) corresponding to the one hundred sixty first pixel in the second band and to detect and store the errors for distance b between the first and second bands, at step S47.

The corrected carrying distance of the document is obtained and stored by adding the errors for distance between the bands to the actual carrying distance of the document, at step S48. Then, the pattern data having the inclined straight line is horizontally moved by the predetermined number of pixels in the first band, at step S49. The document is carried along the pathway at the corrected carrying distance in the scanner, at step S50. Accordingly, since the corrected carrying distance is smaller than the actual carrying distance, the errors for distance between the bands are corrected as the carrying distance is decreased.

On the other hand, provided that the pattern data having the inclined straight line are inclined at angle of 45°, a value of the errors for distance between the bands is the same as a value of the errors between the pixel in which the pattern data are detected in the last line of the first band and the pixel in which the pattern data are detected in the first line of the second band. Therefore, the errors for distance between the bands can be easily obtained.

Figure 8:
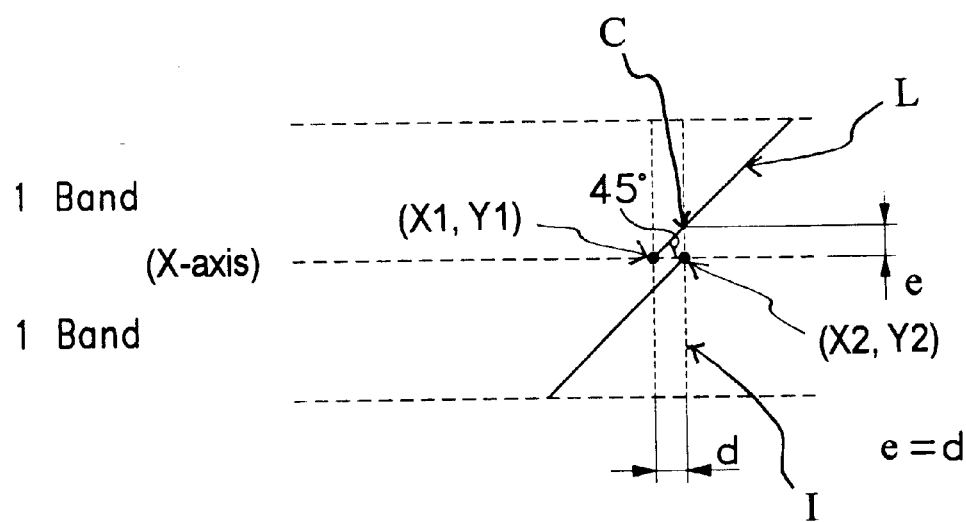
FIG. 8 is a flow chart showing a process of correcting the errors for decline of the image in scanning according to the present invention.

In the pattern data having the inclined straight line of which the errors for decline are corrected as shown in FIG. 8, errors d for distance on an x-axis between the first coordinate (X1, Y1) of the pixel in which the pattern data are detected in the last line of the first band and the second coordinate (X2, Y2) of the pixel in which the pattern data are detected in the first line of the second band is the same as the distance e between the second coordinate and a contact point C at which an imaginary line I extending from the second coordinate in the direction normal to the boundary of the first and second bands intersects the inclined straight line L in the first band. Therefore, the actual errors for distance between the bands can be easily obtained using the errors d for distance on the x-axis.

According to the method for correcting the scanning errors in the shuttle type scanner of the present invention, the errors for decline and the errors for distance between the bands can be corrected using software such as an application program without the separate operation of a hardware in the scanner. Furthermore, even if the scanning errors are generated due to an exterior impact to the scanner, the scanning errors can be corrected easy and promptly.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modification may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for correcting scanning errors in a shuttle type scanner, comprising the steps of:

scanning a recordable medium on which pattern data are recorded which have a straight line shape in parallel to a direction that a document is carried;

detecting scanning errors between a coordinate at which the pattern data having the straight line shape is detected in a first line of a band and a coordinate at which the pattern data is detected in a last line of the band;

detecting a reference point at which a center line of the band intersects the pattern data having the straight line shape and rotating the pattern data on the reference point by a half value of the scanning errors to correct the scanning errors; and storing a correcting value determined from the scanning errors for correcting a decline of the pattern data, wherein the correcting value for the decline of the pattern data is applied to document data to correct for scanning errors when scanning the document.

2. The method for correcting scanning errors in a shuttle type scanner as claimed in claim 1, wherein the recordable medium is a pattern sheet.

3. The method for correcting scanning errors in a shuttle type scanner as claimed in claim 1, wherein the pattern data are straight lines stamped at a point of a frame of the scanner in a scanning region which is spaced apart from a region on which the document is carried.

4. A method for correcting scanning errors in a shuttle type scanner, comprising the steps of:

scanning a recordable medium on which pattern data having a straight line shape are recorded in parallel to a direction that a document is carried;

detecting scanning errors between a coordinate at which the pattern data having the straight line shape is detected in a first line of a first band and a coordinate at which the pattern data is detected in a last line of the first band;

detecting a first reference point at which a center line of the first band intersects the pattern data having the straight line shape in the first band and rotating the pattern data on the first reference point by half of the scanning errors detected using the first band;

detecting a coordinate at which the pattern data having the straight line shape is detected in a second band and determining a presumed coordinate when the pattern data in the second band are extended along the coordinate at which the pattern data having the straight line shape is detected in the second band to a last line of the first band;

comparing the presumed coordinate with the coordinate in the last line of the first band to detect scanning errors using the second band;

correcting the scanning errors detected using the second band by moving the pattern data having the straight line shape in the second band by amount of the scanning errors detected using the second band; and detecting a second reference point at which a center line of the second band intersects the pattern data having the straight line shape in the second band and rotating the pattern data having the straight line shape on the second reference point by half of the scanning errors detected using the second band, wherein a correcting value determined from the scanning errors detected using the first band and the scanning errors detected using the second band for a decline of the pattern data is applied to document data to correct for scanning errors when scanning the document.

5. The method for correcting scanning errors in a shuttle type scanner as claimed in claim 4, wherein the recordable medium is a pattern sheet.

6. The method for correcting scanning errors in a shuttle type scanner as claimed in claim 4, wherein the pattern data are straight lines stamped at a point of a frame in a scanning region which is spaced apart from a region on which the document is carried.

7. A method for correcting scanning errors in a shuttle type scanner, comprising the steps of:

scanning a recordable medium on which pattern data having a specified shape are recorded;

detecting an actual coordinate of a pixel in which the pattern data having the specified shape is recorded in a first line of a second band;

detecting a contact coordinate at which an imaginary line extending from the actual coordinate in a direction normal to a boundary line between a first band and the second band intersects the pattern data in the first band;

determining scanning errors for a vertical axis between the actual coordinate and the contact coordinate;

detecting a carrying distance for a document for correcting the scanning errors for the vertical axis by adding an actual carrying distance to the scanning errors for the vertical axis; and storing the carrying distance, wherein the document is carried by the carrying distance when scanning the document to correct for scanning errors for the vertical axis.

8. The method for correcting scanning errors in a shuttle type scanner as claimed in claim 7, wherein the recordable medium is a pattern sheet.

9. The method for correcting scanning errors in a shuttle type scanner as claimed in claim 7, wherein the pattern data are straight lines stamped at a point of a frame in a scanning region which is spaced apart from a region on which the document is carried.

10. The method for correcting scanning errors in a shuttle type scanner as claimed in claim 7, wherein the pattern data having the specified shape can have any shape, except for a straight line extending in a direction that the document is carried.

11. A method for correcting scanning errors in a shuttle type scanner, comprising the steps of:

scanning a recordable medium on which pattern data having a specified shape are recorded;

creating an imaginary pattern data by horizontally moving the pattern data having the specified shape by a predetermined number of pixels in a predetermined direction in a first band;

detecting an actual coordinate of a pixel in which the pattern data having the specified shape is recorded in a first line of a second band;

detecting a contact coordinate at which an imaginary line extending from the actual coordinate in a direction normal to a boundary line between the first band and the second band intersects the imaginary pattern data in the first band;

determining scanning errors for a vertical axis between the first band and the second band using the contact coordinate and the actual coordinate;

horizontally moving the pattern data having the specified shape in a direction opposed to the predetermined direction by the predetermined number of pixels in the first band;

detecting a carrying distance of a document for correcting the scanning errors for the vertical axis by adding an actual carrying distance of the document to the scanning errors for vertical axis; and storing the carrying distance,
wherein the document is carried at the carrying distance when scanning the document to correct for the scanning errors of the vertical axis.

12. The method for correcting scanning errors in a shuttle type scanner as claimed in claim 11, wherein the recordable medium is a pattern sheet.

13. The method for correcting scanning errors in a shuttle type scanner as claimed in claim 11, wherein the pattern data has a straight line stamped at a point of a frame in a scanning region which is spaced apart from a region on which the document is carried.

14. The method for correcting scanning errors in a shuttle type scanner as claimed in claim 11, wherein the pattern data having the specified shape have any pattern except for straight lines extending in a direction that the document is carried.

15. A method for correcting scanning errors in a shuttle type scanner, comprising the steps of:

scanning a recordable medium on which pattern data having an inclined line shape and inclining at an angle of 45° are recorded;

detecting a first coordinate of a pixel in which the pattern data having the inclined line shape is recorded in a last line of a first band;

detecting a second coordinate of a pixel in which the pattern data having the inclined line shape is recorded in a first line of a second band;

determining distance errors for a horizontal axis between the first coordinate and the second coordinate;

detecting a carrying distance of a document for correcting the distance errors for the horizontal axis by adding an actual carrying distance of the document to the distance errors for the horizontal axis; and storing the carrying distance,
wherein the document is carried by the carrying distance to correct for the distance errors of the horizontal axis when scanning the document.

16. The method for correcting scanning errors in a shuttle type scanner as claimed in claim 15, wherein the recordable medium is a pattern sheet.

17. The method for correcting scanning errors in a shuttle type scanner as claimed in claim 15, wherein the pattern data are straight lines stamped at a point of a frame in a scanning region which is spaced apart from a region on which the document is carried.

18. A method for correcting scanning errors in a shuttle type scanner, comprising the steps of:

scanning a recordable medium on which pattern data are recorded having a specified shape and having straight lines extending in a direction that a document is carried;

correcting errors for decline by using the pattern data having the straight lines in the pattern data which are scanned;

storing a value of correcting the errors for decline;

correcting distance errors between bands by using the pattern data having the specified shape after correcting errors for decline; and storing a value of correcting the distance errors between the bands,
wherein the value of correcting the errors for decline and the value of correcting the distance errors between the bands is applied to scanned document data when scanning the document.

19. The method for correcting scanning errors in a shuttle type scanner as claimed in claim 18, wherein the recordable medium is a pattern sheet.

20. The method for correcting scanning errors in a shuttle type scanner as claimed in claim 18, wherein the pattern data having the straight lines are stamped at a point of a frame in a scanning region which is spaced apart from a region on which the document is carried.

21. The method for correcting scanning errors in a shuttle type scanner as claimed in claim 18, wherein the pattern data having the specified shape include any shape except for a straight line.

22. The method for correcting scanning errors in a shuttle type scanner as claimed in claim 18, wherein the step for correcting errors for decline comprises the steps of:

detecting errors for decline between an actual coordinate at which the pattern data having the straight lines is detected in a first line of a band and an actual coordinate at which the pattern data having the straight lines is detected in a last line of the band; and detecting a reference point at which a center line of the band intersects the pattern data having the straight lines in the band and rotating the pattern data on the reference point in a direction to the center line by a half value of the errors for decline.

23. The method for correcting scanning errors in a shuttle type scanner as claimed in claim 18, wherein the step for correcting the errors for decline comprises the steps of:

detecting errors for decline between an actual coordinate at which the pattern data having the straight lines is detected in a first line of a first band and an actual coordinate at which the pattern data having the straight lines is detected in a last line of the first band;

detecting a first reference point at which a center line of the first band intersects the pattern data having the straight lines in the first band and rotating the pattern data on the first reference point in a direction to the center line of the first band by a half value of the errors for decline detected using the first band;

detecting an actual coordinate at which the pattern data having the straight lines is detected in a first line of a second band and determining a presumed coordinate by extending the pattern data in the second band to the last line of the first band;

detecting errors for decline by comparing the actual coordinate in the last line of the first band with the presumed coordinate;

correcting errors for decline by moving the pattern data having the straight lines in the second band by an amount of the errors for decline detected using the actual coordinate in the last line of the first band and the presumed coordinate; and detecting a second reference point at which a center line of the second band intersects the pattern data having the straight lines in the second band and rotating the pattern data having the straight lines on the second reference point in a direction to the center line of the second band by a half value of the errors for decline detected using the actual coordinate in the last line of the first band and the presumed coordinate.

24. A method for correcting scanning errors in a shuttle type scanner as claimed in claim 18, wherein the step for correcting distance errors between bands comprises the steps of:

detecting an actual coordinate of a pixel in which the pattern data having the specified shape is recorded in a first line of a second band;

detecting a contact coordinate at which an imaginary line extending from the actual coordinate in a direction normal to a boundary line between a first band and the second band intersects the pattern data having the specified shape in the first band;

determining errors for distance between the contact coordinate and the actual coordinate; and detecting a carrying distance for a document for correcting the errors for distance by adding the errors for distance to the actual carrying distance.

25. The method for correcting scanning errors in a shuttle type scanner as claimed in claim 18, wherein the step for correcting errors for distance between bands comprises the steps of:

creating presumed pattern data by moving the pattern data having the specified shape in a predetermined direction by a predetermined number of pixels in a first band;

detecting an actual coordinate of a pixel in which the pattern data having the specified shape is recorded in a first line of a second band;

detecting a contact coordinate at which an imaginary line extending from the actual coordinate in a direction normal to a boundary line between the first band and the second band intersects the presumed pattern data in the first band;

determining errors for distance between the actual coordinate and the contact coordinate;

restoring the pattern data having the specified shape by moving the pattern data in a direction opposed to the predetermined direction by the predetermined number of pixels in the first band; and detecting a carrying distance of a document by adding an actual carrying distance of the document to the errors for distance.

26. The method for correcting scanning errors in a shuttle type scanner as claimed in claim 18, wherein the pattern data having the specified shape includes straight lines inclined at the angle of 45°.

27. The method for correcting scanning errors in a shuttle type scanner as claimed in claim 26, wherein the step for correcting distance errors between bands comprises the steps of:

scanning a recordable medium on which the straight lines inclined at the angle of 45° are recorded;

detecting a first coordinate of a pixel in which the pattern data having the straight lines inclined at an angle of 45° is recorded in a last line of a first band;

detecting a second coordinate of a pixel in which the pattern data having the straight lines inclined at an angle of 45° is recorded in a first line of a second band;

determining errors for a distance between the first coordinate and the second coordinate; and detecting a carrying distance for a document by adding an actual carrying distance of the document to the errors for the distance, wherein the document is carried at the carrying distance when scanning the document.

28. An apparatus for correcting scanning errors in a shuttle type scanner, comprising:

a scanner for scanning a recordable medium on which pattern data are recorded which have a straight line shape in parallel to a direction that a document is carried;

a processor for detecting scanning errors between a coordinate at which the pattern data having the straight line shape is detected in a first line of a band and a coordinate at which the pattern data is detected in a last line of the band, and for detecting a reference point at which a center line of the band intersects the pattern data having the straight line shape and rotating the pattern data on the reference point by a half value of the scanning errors to correct the scanning errors; and a memory for storing a correcting value determined from the scanning errors for correcting a decline of the pattern data, wherein the correcting value for the decline of the pattern data is applied to document data to correct for scanning errors when scanning the document.

29. An apparatus for correcting scanning errors in a shuttle type scanner, comprising:

a scanner for scanning a recordable medium on which pattern data having a straight line shape are recorded in parallel to a direction that a document is carried; and a processor, the processor for:

detecting scanning errors between a coordinate at which the pattern data having the straight line shape is detected in a first line of a first band and a coordinate at which the pattern data is detected in a last line of the first band;

detecting a first reference point at which a center line of the first band intersects the pattern data having the straight line shape in the first band and rotating the pattern data on the first reference point by half of the scanning errors detected using the first band;

detecting a coordinate at which the pattern data having the straight line shape is detected in a second band and determining a presumed coordinate when the pattern data in the second band are extended along the coordinate at which the pattern data having the straight line shape is detected in the second band to a last line of the first band;

comparing the presumed coordinate with the coordinate in the last line of the first band to detect scanning errors using the second band;

correcting the scanning errors detected using the second band by moving the pattern data having the straight line shape in the second band by amount of the scanning errors detected using the second band; and detecting a second reference point at which a center line of the second band intersects the pattern data having the straight line shape in the second band and rotating the pattern data having the straight line shape on the second reference point by half of the scanning errors detected using the second band, wherein a correcting value determined from the scanning errors detected using the first band and the scanning errors detected using the second band for a decline of the pattern data is applied to document data to correct for scanning errors when scanning the document.

30. An apparatus for correcting scanning errors in a shuttle type scanner, comprising:
   a scanner for scanning a recordable medium on which pattern data having a specified shape are recorded;
   a processor for detecting an actual coordinate of a pixel in which the pattern data having the specified shape is recorded in a first line of a second band, for detecting a contact coordinate at which an imaginary line extending from the actual coordinate in a direction normal to a boundary line between a first band and the second band intersects the pattern data in the first band, for determining scanning errors for a vertical axis between the actual coordinate and the contact coordinate, and for detecting a carrying distance for a document for correcting the scanning errors for the vertical axis by adding an actual carrying distance to the scanning errors for the vertical axis; and
   a memory for storing the carrying distance,
      wherein the document is carried by the carrying distance when scanning the document to correct for scanning errors for the vertical axis.

31. An apparatus for correcting scanning errors in a shuttle type scanner, comprising:
   a scanner for scanning a recordable medium on which pattern data having a specified shape are recorded;
   a processor, the processor for:
      creating an imaginary pattern data by horizontally moving the pattern data having the specified shape by a predetermined number of pixels in a predetermined direction in a first band;
      detecting an actual coordinate of a pixel in which the pattern data having the specified shape is recorded in a first line of a second band;
      detecting a contact coordinate at which an imaginary line extending from the actual coordinate in a direction normal to a boundary line between the first band and the second band intersects the imaginary pattern data in the first band;
      determining scanning errors for a vertical axis between the first band and the second band using the contact coordinate and the actual coordinate;
      horizontally moving the pattern data having the specified shape in a direction opposed to the predetermined direction by the predetermined number of pixels in the first band;
      detecting a carrying distance of a document for correcting the scanning errors for the vertical axis by adding an actual carrying distance of the document to the scanning errors for vertical axis; and
   a memory for storing the carrying distance,
      wherein the document is carried at the carrying distance when scanning the document to correct for the scanning errors of the vertical axis.

32. An apparatus for correcting scanning errors in a shuttle type scanner, comprising:
   a scanner for scanning a recordable medium on which pattern data having an inclined line shape and inclining at an angle of 45° are recorded;
   a processor for detecting a first coordinate of a pixel in which the pattern data having the inclined line shape is recorded in a last line of a first band, for detecting a second coordinate of a pixel in which the pattern data having the inclined line shape is recorded in a first line of a second band, for determining distance errors for a horizontal axis between the first coordinate and the second coordinate, and for detecting a carrying distance of a document for correcting the distance errors for the horizontal axis by adding an actual carrying distance of the document to the distance errors for the horizontal axis; and
   a memory for storing the carrying distance,
      wherein the document is carried by the carrying distance to correct for the distance errors of the horizontal axis when scanning the document.

33. An apparatus for correcting scanning errors in a shuttle type scanner, comprising:
   a scanner for scanning a recordable medium on which pattern data are recorded having a specified shape and having straight lines extending in a direction that a document is carried;
   a processor for correcting errors for decline by using the pattern data having the straight lines in the pattern data which are scanned, and for correcting distance errors between bands by using the pattern data having the specified shape after correcting the errors for decline; and
   a memory for storing a value of correcting the errors for decline and for storing a value of correcting the distance errors between the bands,
      wherein the value of correcting the errors for decline and the value of correcting the distance errors between the bands is applied to scanned document data when scanning the document.

* * * * *